US005922461A

United States Patent [19]

Inoue et al.

[11] Patent Number: 5,922,461

[45] Date of Patent: Jul. 13, 1999

[54] METHOD FOR INHIBITING ADSORPTION OF CONTAINER-DERIVED CONTAMINANTS ON DRUGS AND CONTAMINATION-INHIBITORY CONTAINERS

[75] Inventors: Fujio Inoue; Masamitsu Izumi, both of Naruto; Satoru Hayashi, Itano-gun; Chieko Yoshida, Naruto, all of Japan

[73] Assignee: Otsuka Pharmaceutical Factory, Inc., Tokushima, Japan

[21] Appl. No.: 08/849,618

[22] PCT Filed: Dec. 4, 1995

[86] PCT No.: PCT/JP95/02487

§ 371 Date: Jun. 5, 1997

§ 102(e) Date: Jun. 5, 1997

[87] PCT Pub. No.: WO96/17578

PCT Pub. Date: Jun. 13, 1996

[30] Foreign Application Priority Data

Dec. 8, 1994 [JP] Japan .................................... 6-304686

[51] Int. Cl.[6] .................................................... C09K 15/04

[52] U.S. Cl. ........................ 428/368; 428/35.7; 428/34.5; 502/1; 206/828; 206/438; 206/524.4; 206/524.5; 206/205; 206/213.1; 422/40

[58] Field of Search ................................. 428/34.5, 35.7, 428/36.8; 502/1; 206/828, 438, 524.4, 524.5, 205, 213.1; 252/383–385, 397, 400.3; 422/40

[56] References Cited

U.S. PATENT DOCUMENTS 4,820,442 4/1989 Motoyama et al. ............... 252/188.28

*Primary Examiner*—Charles Nold
*Attorney, Agent, or Firm*—Sughrue, Mion, Zinn, Macpeak & Seas, PLLC

[57] ABSTRACT

This invention provides a method for inhibiting adsorption of container-derived contaminants on a powdery or solid drug which comprises establishing a lower alcohol vapor phase within a container made, at least in part, of rubber or a plastic material. The method inhibits adsorption of container-derived substances on a drug to preclude development of insoluble particulate matter owing to said adsorption in an aqueous solution prepared extemporaneously without causing loss of the drug and avoiding the toxic effect of decomposition or degradation of the drug, thus insuring a long-term trouble-free stable shelf-life of the drug.

7 Claims, 1 Drawing Sheet

METHOD FOR INHIBITING ADSORPTION OF CONTAINER-DERIVED CONTAMINANTS ON DRUGS AND CONTAMINATION-INHIBITORY CONTAINERS

TECHNICAL FIELD

The present invention relates to a method for inhibiting adsorption of container-derived contaminants on drugs such as powdery drugs and to a container housing a drug in stable condition.

BACKGROUND OF THE INVENTION

Glass containers are mainly used for powdery or solid pharmaceutical preparations containing antibiotics, e.g. cefazolin, ampicillin, etc., or enzymes, e.g. urokinase etc., as active ingredients, while containers made of almite (aluminum with a surface oxide film), hard glass, stainless steel, or the like are used for accommodating the starting materials or synthetic intermediates of drugs and the so-called bulk substances.

However, containers made of such materials are disadvantageous in that the drugs contained are liable to become contaminated with metal or glass fragments upon unsealing.

Recently, containers made of glass (borosilicate glass, soda-lime glass) plus rubber, elastomeric closure or the like came into usage but they were also found to have the disadvantage that the antioxidant, e.g. 2,6-di-t-butyl-4-methylphenol (BHT), vulcanizer, adipic acid derivative, phthalic acid derivative, and other additives, as well as the lubricant oil, e.g. silicone oil, tend to emigrate from the rubber or elastomeric closure and become adsorbed on the drugs to cause insoluble particulate matter.

Research is also being done into the use of plastics for pharmaceutical containers, but polyvinyl chloride (PVC), for instance, has the drawback that additives such as dioctyl phthalate (DOP) contained may dissolve out into the interior of the container, while nylon, polyurethane, ethylene-vinyl acetate copolymer (EVA), etc. have the disadvantage that the residual unreacted monomer or monomers tend to prevent formation of a homogeneous solution of the powdery drug. Furthermore, while an adhesive is used in the manufacture of containers from nylon, polyurethane, etc., the solvent used in the adhesive, such as methyl ethyl ketone, toluene, or xylene, diffuse out and become adsorbed on the drug as it is the case with said unreacted monomers, thus causing decomposition, degradation, insoluble particulate matter, and other troubles inclusive of toxic interactions.

The feasibility of using polyolefins such as polyethylene and polypropylene is also being assessed by the industry and their usage for pharmaceutical containers is being spreading but these materials also have the disadvantage that the process-derived contaminants such as adipic acid or phthalic acid derivatives, oils, low molecular substances, the so called wax component, etc. tend to be adsorbed on the drug powder contained and when the drug powder is dissolved in a solvent such as water for injection, give rise to insoluble particulate matter.

Thus, each of the known materials for pharmaceutical containers has its own drawbacks and, therefore, a demand exists for a new method of overcoming said disadvantages and a new kind of drug container which is free from the disadvantages.

SUMMARY OF THE INVENTION

The object of the present invention, therefore, is to provide a method for providing an improved pharmaceutical container for powdery or other medicines and a novel improved container.

The inventors of the present invention did much research for accomplishing the above-mentioned object and discovered that when a lower alcohol vapor phase is established as the internal atmosphere of a container, the adsorption of potential contaminants derived from the container material, such as rubber or a plastic, on the drug substance is remarkably inhibited, with the result that the incidence of insoluble particulate matter (non-homogeneous dissolution) in a solution of the drug is completely precluded without any appreciable loss of the drug substance due to decomposition, degradation, or aging, without entailing any associated toxic reaction, and without detracting from the inherent solubility of the powdery drug, thus insuring a long-term stability and clinical safety of the drug.

The present invention has been brought into being based on the above finding.

DESCRIPTION OF THE SYMBOLS

1 pharmaceutical container

Figure 1:
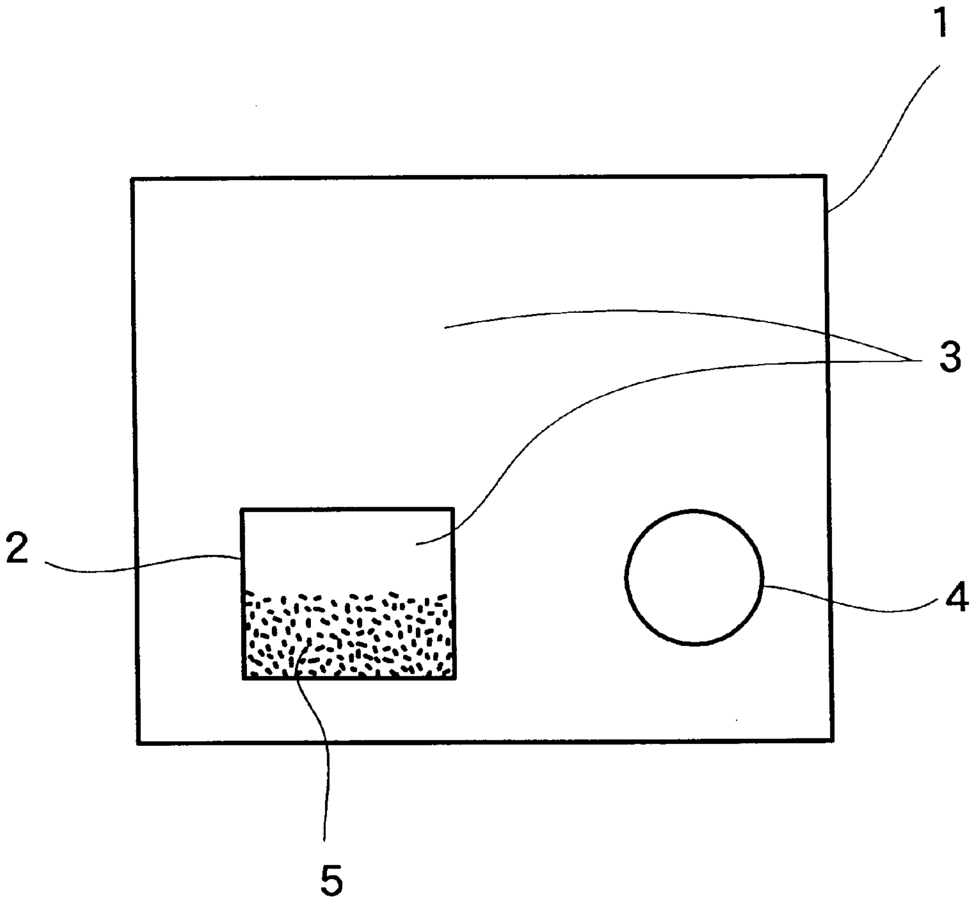
FIG. 1 is a view illustrating the presence of a lower alcohol permeable pouch or cell, lower alcohol and drug within the pharmaceutical container.

2 lower alcohol-permeable plastic pouch or cell

3 internal atmosphere of the pharmaceutical container

4 matrix impregnated with a lower alcohol or carrying it as adsorbed thereon

5 powdery or solid drug or drug intermediate.

DETAILED DESCRIPTION OF THE INVENTION

The present invention provides a method of inhibiting adsorption of container-derived contaminants on a powdery or solid drug characterized in that, in accommodating a powdery or solid drug preparation, drug material, or drug intermediate (hereinafter referred to sometimes as a drug or equivalent) in a pharmaceutical container 1 made, at least in part, of rubber, elastomer or a plastic material, a lower alcohol vapor phase is established as the internal atmosphere 3 of the container 1.

More particularly, the present invention provides a method for inhibiting adsorption of container-derived contaminants on a drug or equivalent, wherein a matrix impregnated with a lower alcohol 4 or carrying it as adsorbed thereon is accommodated in a container 1 so as to establish a lower alcohol vapor phase as the internal atmosphere 3 of the container; the same method wherein ethanol is used as said lower alcohol; and the same method as above wherein a lower alcohol-permeable plastic pouch or cell 2 containing a powdery or solid drug or equivalent 5 and a matrix impregnated with a lower alcohol or carrying it as adsorbed thereon 4 are accommodated in a container 1 so as to establish a lower alcohol vapor phase as the internal atmosphere of said cell 2.

The present invention further provides a pharmaceutical package form for a powdery or solid drug or equivalent which comprises a container 1 made, at least in part, of rubber, elastomer or a plastic material and containing a matrix impregnated with a lower alcohol or carrying the same as adsorbed thereon for establishing a lower alcohol vapor phase as the internal atmosphere of the container, and a pharmaceutical package form comprising a lower alcohol-permeable plastic cell 2 containing a powdery or solid drug or equivalent and an outer container containing a matrix impregnated with a lower alcohol or carrying it as adsorbed thereon for establishing a lower alcohol vapor phase as the internal atmosphere of said cell 2.

The drug that can be used in the present invention includes water-soluble powdery or solid drugs which can be directly administered to man and other animals, including but not limited to antibiotics such as cephazolin and other cephem antibiotics, ampicillin and other penicillin compounds, imipenem and other carbapenem antibiotics, vancomycin and other polypeptide antibiotics, erythromycin and other macrolide antibiotics, etc., bioactive substances (native and recombinant bioactive substances) such as interferons (INF), interleukins (IL), vaccines, erythropoietins (EPO), granulocyte colony stimulating factor (GCF), immunoglobulins, urokinase and other enzymes, vitamins, platelet activating factor (PAF), water-soluble steroids (adrenocorticoids) and other hormones, and synthetic inhibitors of enzymes which are not naturally occurring, among others. The pharmaceutical intermediates include synthetic intermediates and production intermediates of the above-mentioned and other drugs.

When any of these drugs is accommodated in a container made of rubber, elastomer and/or plastic material, it undergoes interaction with various substances originating from the container material or materials to adsorb them.

Typical of said container-derived substances or contaminants are various additives, e.g. antioxidants such as BHT, DOP, vulcanizers, adipic acid derivatives, phthalic acid derivatives, etc., oils such as silicone oil, unreacted monomers, and organic volatile solvents for adhesives, such as methyl ethyl ketone, toluene, xylene, etc.

The lower alcohol that can be used for establishing said lower alcohol vapor phase as the internal atmosphere of the container includes ethanol, a representative alcohol, methanol, propanol, isopropyl alcohol, etc. Among them, ethanol is particularly preferred when the drug is to be directly administered. However, when a synthetic intermediate or the like of the active ingredient, such as a production bulk powder, the lower alcohol need not be ethanol but other lower alcohols may be employed with equal success.

The preferred technology for establishing a lower alcohol vapor phase as the internal atmosphere of the container in accordance with the present invention includes the method in which a matrix impregnated with a lower alcohol or carrying it as adsorbed thereon is accommodated alongside a drug in the container 1 and the double-packaging method in which a lower alcohol-permeable cell 2 filled with a powdery or solid drug is accommodated alongside a matrix impregnated with a lower alcohol or carrying it as adsorbed thereon in said container 1.

There is no particular limitation on the kind of matrix to be impregnated with a lower alcohol or on which a lower alcohol is to be adsorbed. Typically, however, inorganic porous substances such as silica gel, diatomaceous earth, celite, zeolite, activated carbon, alumina, etc., cellulose and its derivatives, dextrins, polysaccharides, synthetic polymers such as polypropylene, polyurethane, etc., and other high-porosity formed substances can be mentioned. It is also possible to employ nonwoven fabrics manufactured from said polymers or formed substances.

Impregnation of the matrix with a lower alcohol or adsorption of a lower alcohol on the matrix can be carried out in the per se known manner. There also is no particular limitation on the ratio of the lower alcohol to the matrix. The saturation point is generally used as a reference but the lower alcohol may be used in a sub-saturation amount. When, for example, the matrix is zeolite which has a high hygroscopic capacity, the preferred proportion of the lower alcohol may be not less than 51% saturation. There is no particular limitation on the amount of the matrix impregnated with the lower alcohol or carrying it as adsorbed thereon to be contained in the container. Thus, the amount can be liberally selected only if the lower alcohol vapor phase effective for accomplishing the object of the invention may be established within the container. Taking a container having a capacity of 20–100 cubic centimeters and containing a powdery drug as an example, it is possible to obtain a lower alcohol vapor phase sufficient to accomplish the object of the invention by dripping 1 $\mu$l of distilled ethanol on the inside wall of the container.

In the method of the present invention wherein a matrix impregnated with a lower alcohol or carrying it as adsorbed thereon is accommodated for establishing a lower alcohol vapor phase as the internal atmosphere of the container and said matrix is one having a large hygroscopic capacity such as zeolite or alumina, it is preferable to further accommodate a moisture-releasing disoxidation agent in the container. The reason is that when the interior of the container is very dry, the lower alcohol in said matrix is hard to be released into the internal atmosphere but when said moisture-releasing disoxidation agent is concomitantly present, the moisture released therefrom is adsorbed on said matrix in substitution for said lower alcohol, with the result that the lower alcohol is released effectively from the matrix into the internal atmosphere of the container.

There is no particular limitation on the shape and size of the container for use in the present invention only if it is made, at least in part, of rubber, elastomer or a plastic material and the kind of rubber, elastomer or plastic material may also be any of the kinds known to be useful for pharmaceutical containers. For example, the rubber that can be used includes natural rubber, butyl rubber, isoprene rubber, etc., while the plastic material includes but is not limited to polyolefins such as polyethylene, polypropylene, etc., polyvinyl chloride, polyamide, polyurethane, ethylene-vinyl acetate copolymer, polyethylene terephthalate, polyvinylidene chloride, and polyvinyl alcohol.

The pharmaceutical container made, at least in part, of rubber, elastomer or plastic material as mentioned throughout this specification includes glass containers including rubber or elastomeric closure, plastic film containers, and laminate containers consisting of an inner layer comprising a plastic film and an outer layer comprising an aluminum foil, among other containers.

In addition to the above method of inhibiting adsorption of container-derived substances on the drug powder or the like, the present invention provides a drug container suited for implementation of the above method. This drug container is made, at least in part, of rubber, elastomer or plastic material and contains a matrix impregnated with a lower alcohol or carrying it as adsorbed thereon for establishing a lower alcohol vapor phase therein so that, when a powdery or solid drug is filled therein, adsorption of container-derived substances on the drug may be positively inhibited and the drug can thereby be kept in stabilized condition for a long period of time.

The material that can be used for the fabrication of said pharmaceutical container 1 according to the present invention is preferably highly impermeable to lower alcohol vapors and moisture. As examples of such material, there can be mentioned a polyolefin film-aluminum foil laminate, a resin film made of, for example, polyethylene terephthalate, polyvinylidene chloride, polyvinyl alcohol, polyamide, or saponified ethylene-vinyl acetate copolymer, and a laminate film comprising such resin films.

According to one embodiment of the pharmaceutical container according to the present invention, the drug is accommodated in a lower alcohol-permeable plastic cell 2 and, as such, is further accommodated alongside said matrix in a container 1 (double-packaged form).

In this form of container, the drug is protected from direct contact with an outer packaging material, i.e. said container 1, so that the above-mentioned disadvantages caused by adsorption of container-derived substances on the drug are avoided. However, a similar problem may develop owing to adsorption of substances derived from plastic cell 2, which is the inner packaging material. However, this problem is neatly solved by utilizing said matrix impregnated with a lower alcohol or carrying it as adsorbed thereon in accordance with the present invention.

Thus, when said matrix is accommodated alongside said drug-containing cell 2 in the container 1, the vapor of the alcohol from the matrix permeates through the wall of cell 2 and diffuses into the cell 2 to establish a lower alcohol vapor phase within the cell 2 to accomplish the object of the invention.

Therefore, the cell 2 must be made of a material permeable to the lower alcohol. As examples of such material, there can be mentioned polyolefins, e.g. polyethylene and polyvinyl chloride. There are cases in which the above permeability to a lower alcohol can be insured not only by selecting the proper material for the cell 2 but also by varying (reducing) the thickness of the cell. Therefore, the term "lower alcohol-permeable" as used referring to cell 2 is not an absolute term but a relative term in relation to the permeability of the container 1.

BEST MODE OF PRACTICING THE INVENTION

To describe the present invention in further detail, some examples of production of the matrix for use in the method of the invention are given as reference examples and, then, examples of working the method of the invention and test examples for demonstrating the effect of working the method are described.

REFERENCE EXAMPLE 1

A zeolite matrix with a pore size of not less than 3 angstrom units (pore diameters are not uniform but have a normal distribution) was immersed in distilled ethanol and allowed to stand there at room temperature for 24 hours. The matrix was then withdrawn from the ethanol bath and the excess ethanol, mostly adherent on the surface of the matrix, was removed by means of zeolite-passed nitrogen gas, dry air, or hot nitrogen gas, or hot dry air. In this manner, an ethanol-saturated zeolite matrix was obtained.

This ethanol-saturated zeolite was optionally mixed with a predetermined proportion, e.g. half the weight of the ethanol-saturated zeolite, of the untreated zeolite to provide an ethanol-impregnated matrix for use in the invention.

REFERENCE EXAMPLE 2

A carrier made of zeolite with a pore diameter of not less than 3 angstrom units was put in a glass desiccator containing distilled ethanol in its bottom and allowed to stand at room temperature for 2 weeks to provide an ethanol-saturated zeolite matrix.

Optionally. this ethanol-saturated zeolite was mixed with a predetermined proportion of the untreated zeolite to provide an ethanol-impregnated matrix for use in the invention.

REFERENCE EXAMPLE 3

A glass column was packed with alumina with a pore diameter of not less than 3 angstrom units. Then, hot dry air was passed through distilled ethanol (recycling) to generate ethanol gas and the ethanol gas was passed through the column for 24 hours to provide an ethanol-saturated alumina matrix.

This ethanol-saturated alumina was optionally mixed with a predetermined proportion of the untreated alumina to provide an ethanol-impregnated matrix for use in the invention.

REFERENCE EXAMPLE 4

Using nonwoven fabrics made of cellulose (inclusive of cotton) and polypropylene, respectively, in lieu of zeolite, the procedure of Reference Example 1 was otherwise repeated to provide ethanol-impregnated matrices.

REFERENCE EXAMPLE 5

Using a porous artifact (e.g. sponge) made of polyurethane resin in lieu of zeolite, the procedure of Reference Example 1 was otherwise repeated to provide an ethanol-impregnated matrix.

EXAMPLE 1

Zeolite (Tosoh Corporation, Zeolite ZA4, 9–14 mesh) was saturated with ethanol by the procedure of Reference Example 1 to provide matrix A.

As a highly hygroscopic drug substance, 2 grams (potency) of the commercial lyophilized antibiotic cefmetazole sodium (trade name: Cefmetazon, Sankyo; hereinafter referred to briefly as CMZ) was subjected to the following test.

While the commercial CMZ 2 g (potency) is a product available in a glass vial the CMZ cake was comminuted with a stainless steel microspatula and the resulting powder was filled in a bag (10 cm×10 cm) made of 200 μm-thick low-density polyethylene (LDPE, Showa Denko, MFR, 3.0 g/10 min, d=0.926–0.927) film. (The above operation was performed in an environment with a relative humidity of not more than 25%).

Product A of the invention was prepared by accommodating the above-mentioned CMZ-containing LDPE bag, said matrix A, and a disoxidation agent (Ageless Z10P, Mitsubishi Gas Chemical; hereinafter referred to briefly as Z10P) in a 14 cm×14 cm bag made of aluminum-laminated plastic film and sealing the bag. Meanwhile, an aluminum foil strip was coated with 100 ppm each of diethylhexyl phthalate (DEHP) and di-n-butyl phthalate (DNBP), both of which are substances interfering with the solubility of the drug, and the coated foil strip was put in the above aluminum-laminated plastic film bag.

As a control, the same CMZ-containing LDPE bag and same contaminants-coated foil strip as above were accommodated in a 14 cm×14 cm bag of aluminum-laminated plastic film and the bag was then heat-sealed.

The commercial vial was pierced using a gas syringe-needle for replacement of the internal atmosphere with nitrogen gas and subjected to the same test as vial control.

Each of the above test samples was maintained at 60° C., 75% R.H. (a constant temperature-constant humidity chamber PR-4ST, Tabai-Espec) for 1 and 2 weeks and the oxygen concentration in the bag was determined. At the same time, both appearance and potency (by HPLC) were tested by the methods prescribed in the Minimum Requirements for Antibiotic Products of Japan 1992. The oxygen concentration was measured with Toray Engineering's zirconia oxygen meter LC800. For potency assays, Shimadzu High Performance Liquid Chromatograph LC-9A was used.

In addition, 2 g (potency) of CMZ was dissolved in 20 ml of purified water and the turbidity of the solution was measured with HACH's nephelometer 43900.

The test results are presented in Table 1.

TABLE 1

| Test sample | Storage period (weeks) | Product A of the invention | Control product | Glass vial product |
|---|---|---|---|---|
| Appearance | 0 | White | White | White |
| | 1 | White | White | White |
| | 2 | White | White | White |
| Oxygen concentration (%) | 0 | 20.6 | 20.4 | N.D.* |
| | 1 | 0.73 | 20.6 | N.D.* |
| | 2 | 0.00 | 20.4 | N.D.* |
| Potency (μg/mg) | 0 | 948 | 948 | 945 |
| | 1 | 940 | 944 | 946 |
| | 2 | 933 | 928 | 929 |
| Alcohol odor | 0 | Intense odor | Not tested | Not tested |
| | 1 | Intense odor | Not tested | Not tested |
| | 2 | Intense odor | Not tested | Not tested |
| Turbidity# | 0 | 0.24 | 0.24 | 0.21 |
| | 1 | 0.31 | 1.81 | 0.22 |
| | 2 | 0.26 | 2.87 | 0.44 |

N.D.* = not determinable because the glass vial has been hermetically closed under nitrogen gas.
Turbidity# = mean of n = 3.

It should be noted that neither DEHP nor DNBP was added to the glass vial control.

It is clear from the above table that, according to product A of the invention, the highly hygroscopic drug CMZ can be maintained without degradation and that the release of alcohol from product A is efficient enough to inhibit development of turbidity.

EXAMPLE 2

Zeolite (Zeolite ZA4, 9–14 mesh) was impregnated with ethanol by the procedure described in Reference Example 3 to provide 75%saturated matrix B.

On the other hand, one gram (potency) of lyophilized antibiotic cefazolin sodium (hereinafter referred to as CEZ), a highly hygroscopic drug substance, was filled in a cell (10 cm ×10 cm) made of linear low-density polyethylene film (LLDPE, d=0.920, Mitsui Petrochemical, 175 μm). This cell, the above matrix B, and the disoxidation agent Z10P (one piece) were put in a 12 cm×12 cm bag made of polyvinylidene chloride (PVdc) barrier film (Fujimori Kogyo, inside dimensions 10 cm×10 cm) and the bag was heat-sealed to provide product B of the invention.

The above bag was maintained at 60° C., 75% R.H. (a constant temperature-constant humidity chamber AG328, Advantech Toyo) for 1 and 2 weeks. The gas in the bag was sampled by means of a gas trapping syringe and its alcohol concentration was measured using Shimadzu Gas Chromatograph GC8A, while the oxygen concentration was measured with Toray Engineering's zirconia oxygen meter LC800. In addition, the potency of CEZ was assayed by HPLC (Shimadzu High Performance Liquid Chromatograph LC-9A) and the moisture content was determined with Mitsubishi Kasei's water microassay apparatus CA-06. The potency and moisture content determinations were in accordance with the Minimum Requirements for Antibiotic Products of Japan 1992.

The test results are presented in Table 2.

TABLE 2

| Test sample | Storage period (weeks) | Product B of the invention |
|---|---|---|
| Appearance | 0 | White |
| | 1 | White |
| | 2 | White |
| Oxygen concentration (%) | 0 | 20.4 |
| | 1 | 0.0 |
| | 2 | 0.0 |
| potency (μg/mg) | 0 | 940 |
| | 1 | 933 |
| | 2 | 927 |
| Moisture content (%) | 0 | 0.45 |
| | 1 | 0.53 |
| | 2 | 0.48 |
| Alcohol concentration (%) | 0 | 0.5 |
| | 1 | 7.8 |
| | 2 | 18.1 |

It is apparent from the above table that with product B of the invention, the highly hygroscopic drug substance CEZ can be maintained without degradation and that matrix B releases a sufficient amount of alcohol.

EXAMPLE 3

A mixture of active alumina and celite was molded into a board (about 4×3 cm, about 5 g) and this board was impregnated with 15% by weight of methanol (Wako Pure Chemical Industries, reagent special grade) by dripping to provide matrix C. This matrix was covered with a nonwoven polypropylene cloth.

Then, as an antibiotic bulk, 5 grams of cefazolin sodium (CEZ) bulk powder with a moisture content of 2% (bulk potency =870 μg/mg) was put in a glass bottle of 250 ml capacity. The bottle was closed with a red natural rubber stopper coated with 100 ppm of DEHP and 100 mg of paraffin on the inner surface and the top was masked with a PVC tape to preclude infiltration of moisture. This product was used as a control.

On the other hand, product C of the invention was prepared using same materials as above and by making an incision in a similarly coated rubber stopper and inserting matrix C in the incision at an oblique angle.

The above two products were maintained at 60° C., 75% R.H. (a constant temperature-constant humidity chamber AG328, Adventech Toyo) for 1 and 2 weeks and the potency of the antibiotic, appearance, and turbidity nephelometer reading) were determined as in the preceding examples. The results are presented in Table 3.

TABLE 3

| Test sample | Storage period (weeks) | Products C of the invention | Control product |
|---|---|---|---|
| Appearance | 0 | White | White |
| | 1 | White | White |
| | 2 | White | White |

TABLE 3-continued

| Test sample | Storage period (weeks) | Products C of the invention | Control product |
|---|---|---|---|
| Potency | 0 | 100 before | 100 before |
| (μg/mg) | 1 | 97.8 | 96.4 |
| | 2 | 90.2 | 91.3 |
| Alcohol | 0 | Intense odor | Not tested |
| odor | 1 | Intense odor | Not tested |
| | 2 | Intense odor | Not tested |
| Turbidity# | 0 | 2.78 | 2.78 |
| | 1 | 2.99 | 8.56 |
| | 2 | 2.83 | 17.54 |

Turbidity# : same as Table 1.

It is clear from the above table that with product C of the invention, the bulk drug is protected against the trouble of insoluble particulate matter, thus indicating the effectiveness of product C in the quality maintenance of the drug. Thus, since rubber closure-derived contaminants transferred to a bulk drug would pass through a 0.2 μm filter, it is important to preclude chances for transfer of the contaminants from the bulk stage. This trouble can be successfully avoided by the use of the product of the invention. Moreover, any residue of the alcohol used in the product of the invention can be easily eliminated by, for example, freeze-drying so that the risk of contamination of the drug can be successfully prevented.

INDUSTRIAL APPLICABILITY

In accordance with the present invention, as the result of establishing the vapor phase of a lower alcohol within a container housing a powdery or solid drug or equivalent which is liable to undergo interaction with container-derived substances, adsorption of contaminants on the drug is precluded and the solubility of the drug is fully maintained to prevent development of insoluble particulate matter in a solution prepared extemporaneously. Moreover, the degradation of the active drug substance owing to said adsorption is completely prevented, thus permitting packaging of the drug in a plastic or other container without the risk of toxic interactions.

What is claimed is:

1. A method of inhibiting adsorption of container-derived contaminants on a water-soluble powdery or solid drug or drug intermediate in a container made, at least in part, of rubber, elastomer or plastic material which comprises establishing a lower alcohol vapor phase within said container which includes said powdery or solid drug or drug intermediate.

2. The method according to claim 1 wherein said lower alcohol vapor phase is established by accommodating a matrix impregnated with the lower alcohol or carrying it as adsorbed thereon in said container.

3. The method according to claim 1 or 2 wherein said lower alcohol is ethanol.

4. A method of inhibiting adsorption of container-derived contaminants on a water-soluble powdery or solid drug or drug intermediate which comprises filling said powdery or solid drug or drug intermediate in a lower alcohol-permeable plastic cell, accommodating the cell in a container made, at least in part, of rubber, elastomer or a plastic material, and establishing a lower alcohol vapor phase within said container which includes said powdery or solid drug or drug intermediate.

5. A package for inhibiting adsorption of container-derived contaminants on a water-soluble powdery or solid drug or drug intermediate which comprises an outer container comprising rubber, elastomer or a plastic material, wherein (a) said powdery or solid drug or drug intermediate and (b) a matrix impregnated with a lower alcohol or carrying it as adsorbed thereon for establishing a lower alcohol vapor phase as the interal atmosphere of said outer container, are present within said container.

6. The package according to claim 5, further comprising a lower alcohol-permeable cell within said container, wherein said cell contains said powdery or solid drug or drug intermediate,and wherein said matrix impregnated with a lower alcohol or carrying it as adsorbed thereon for establishing a lower alcohol vapor phase, is also present within said container.

7. A method of inhibiting adsorption of container-derived contaminants on a water-soluble powdery or solid drug or drug intermediate which comprises filling said powdery or solid drug or drug intermediate in a lower alcohol-permeable plastic cell, accommodating the cell in an outer container made, at least in part, or rubber, elastomer or a plastic material, and additionally accommodating within said outer container a matrix impregnated with a lower alcohol or carrying it as adsorbed thereon for establishing a lower alcohol vapor phase as the internal atmosphere of the container.

* * * * *